July 3, 1962  J. L. A. BORTHAYRE  3,042,412

PHONOGRAPHIC RECORD-PLAYER TONE-ARMS

Filed March 4, 1957

INVENTOR
Jean L. A. Borthayre
By

United States Patent Office 3,042,412
Patented July 3, 1962

3,042,412
PHONOGRAPHIC RECORD-PLAYER TONE-ARMS
Jean Léon Albert Borthayre, 39 Rue d'Espagne, Bayonne
(Basses Pyrenees), France
Filed Mar. 4, 1957, Ser. No. 643,836
Claims priority, application France Mar. 8, 1956
5 Claims. (Cl. 274—23)

It has already been suggested to provide the tone-arm of a phonographic record-player with a rigid handling appendix whose setting with respect to the tone-arm proper was fixed, so that the lifting of the tone-arm from its support and its placing on the beginning of the groove on the record had to be effected with great delicacy, depending solely on the manual dexterity of the operator. As a matter of fact, during the displacement of the tone-arm from its support on to the edge of the record, the end of the tone-arm executes not only a movement of translation, but also a rotation. Consequently, the hand and the wrist of the operator must also execute these two movements, which are furthermore combined with the descending motion upon the record, and as soon as the point of the pick-up makes contact with the groove of the record the operator's action must stop with an extreme precision and pliancy, as otherwise the record or the pick-up point would be exposed to damage. The qualities required for the operation of the tone-arm depend therefore in a high degree on the manual dexterity of the operator.

The present invention relates to a record-player tone-arm which has been improved so as to avoid a brutal contact of the pick-up point with the record, without depending on the manual dexterity of the operator. To this effect, the improved tone-arm is essentially characterized in that it is provided with a universally flexible handling appendix.

Other features of the invention will become apparent in the following specification and on the appended drawing, which represents by way of example several embodiments of the invention.

Figure 1:
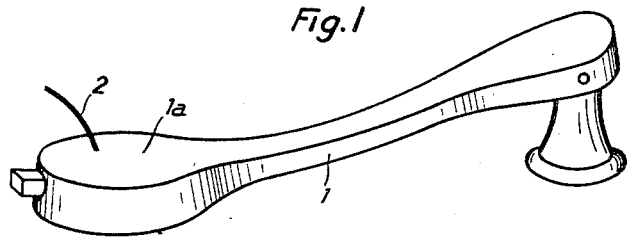
Figure 2:
Figure 3:
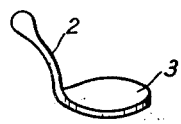

FIG. 1 is a perspective view of the improved tone-arm.
FIGS. 2 to 6 are perspective views of various embodiments of the flexible handling appendix adapted to be removably mounted on the tone-arm.

On FIG. 1, the reference 1 designates the tone-arm, 1a its head containing the pick-up, and 2 the handling appendix which is universally flexible, according to the invention. This appendix is preferably formed by a strand of rubber or any other resilient or flexible material, even a piece of thread or string or a metal wire spring, provided it is sufficiently flexible in all directions. This appendix is attached to the top of the tone-arm head 1a by any convenient means and extends upwards from said top. For example, it may be passed through a hole in the wall of the tone-arm head and formed with a knot underneath, or glued or crimped on the tone-arm head. The appendix may also be mounted so as to be able to rotate freely about its longitudinal axis.

The handling of the tone-arm is effected by holding the end of the flexible appendix 2 between finger and thumb. The flexibility of the operator's wrist is no more relied upon, since it has only to effect the movement of translation, whereas the rotation takes place automatically, as required, within the flexible appendix. Similarly, the descent of the tone-arm head on the record takes place with great precision. The tone-arm being suspended on the flexible appendix, its weight causes a slight tension in the latter, which ceases as soon as the point of the pick-up makes contact with the groove of the record, whereby the operator's hand is automatically disconnected from the tone-arm.

The invention can be put into practice in various manners.

Thus, the appendix can be made of rigid material and be hingedly mounted on the tone-arm, for example by a ball-and-socket joint. The appendix may also be formed by a small coil-spring having sufficient flexibility. The appendix may also be shaped as a hook or a ring.

The handling appendix can be removable, in view of its replacement or in order to be mounted on an ordinary tone-arm. In this case, the appendix may comprise a broad base 3 (FIGS. 2 and 3) adapted to be glued on the head of the tone-arm. This base may be coated beforehand with a layer of adhesive protected against drying by a thin leaf of impermeable plastic, which is removed when the appendix is to be fixed on a tone-arm.

Instead of being glued on the tone-arm, the base 3 may be fixed on the tone-arm head by one or two rigid, flexible or elastic rings or straps, similar to those used for fixing a reel on a fishing rod.

Figure 4:
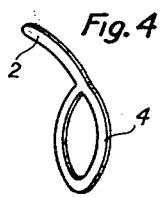

The handling appendix may also be integral with the fixing rings or straps 4, for example by molding or cutting the whole in a single piece of rubber or other flexible material, as shown by way of example on FIG. 4.

Figure 5:
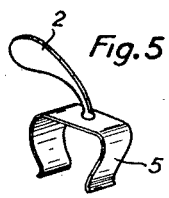

FIG. 5 represents a heterogeneous embodiment in which the base of the appendix 2 constitutes a resilient clip 5 adapted to be clamped on the tone-arm head.

Figure 6:
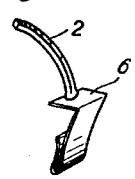

FIG. 6 represents another heterogeneous embodiment comprising a metal base 6 adapted to be clamped resiliently on the edge of the tone-arm head, the flexible appendix 2 being fixed by any convenient means on the top of the base 6.

All these embodiments lie within the scope of the invention in that they include the flexible handling appendix whose flexibility substitutes itself to that of the operator's fingers and wrist. The invention covers the tone-arm provided with the flexible appendix, as well as the latter separately and the association of both in view of the described result.

I claim:
1. A sound pickup arm for record players, comprising an arm mounted for pivotal movement about both substantially vertical and horizontal axes and having a free end swingable about said axes and constituting a pickup head engageable beneath said arm with a record, and handle means extending upwardly from said arm and connected thereto only adjacent said free end thereof for maneuvering said arm to engage said pickup head with a record, said handle means being universally flexible to slacken immediately upon engagement of said pickup head with a record and being of such resiliency as to be self-sustaining in upright position and as to permit lateral deflection thereof without imparting lateral displacement to said arm.

2. A handling device for record player sound pickup arms for maneuvering such an arm to engage its sound pickup with a record, comprising support means attachable to a sound pickup arm, and a handle element carried by said support means and extendible upwardly from the arm when said support means is attached thereto and being connected to said arm only adjacent the free end thereof, said handle element being universally flexible to slacken immediately upon engagement of the arm pickup with a record and being of such resiliency as to be self-sustaining in upright position and as to permit lateral deflection thereof without imparting lateral displacement to said arm.

3. A sound pickup arm handling device according to claim 2 wherein said support means comprises a flat base having adhesive on its underside for attachment to the upper surface of the arm.

4. A sound pickup arm handling device according to claim 2 wherein said support means comprises a loop for surrounding the arm.

5. A sound pickup arm handling device according to claim 2 wherein said support means comprises a spring clip for releasably gripping the arm.

References Cited in the file of this patent

UNITED STATES PATENTS 2,357,034   Thompson _____ Aug. 29, 1944

FOREIGN PATENTS 824,701   Germany _____ Dec. 13, 1951